United States Patent
Hori et al.

[15] 3,635,136
[45] Jan. 18, 1972

[54] PILOT LAMP UNIT FOR USE WITH AN ELECTRONIC FLASHLIGHT

[72] Inventors: Kunihiko Hori; Keno Okuno, both of Kawasaki-shi, Japan

[73] Assignee: Nippon Kogaku K.K., Tokyo, Japan

[22] Filed: Sept. 9, 1969

[21] Appl. No.: 856,424

[30] Foreign Application Priority Data

Sept. 16, 1968 Japan..................................43/80247

[52] U.S. Cl.....................................95/11 R, 95/11 V, 95/42
[51] Int. Cl..........................................................G03b 17/20
[58] Field of Search ........................95/11 R, 11 V, 42, 11.5; 88/1.5; 352/171

[56] References Cited

UNITED STATES PATENTS 3,393,620 7/1968 Reiche et al................................95/11
3,416,422 12/1968 Dietrich et al..............................95/11

*Primary Examiner*—Samuel S. Matthews
*Assistant Examiner*—Richard L. Moses
*Attorney*—Ward, McElhannon, Brooks & Fitzpatrick

[57] ABSTRACT

A pilot lamp unit, for use with an electronic flash gun, attachable to a camera, having a viewfinder. The unit includes a pilot lamp, a first member having a reflecting surface for receiving light from the pilot lamp and directing it to the viewfinder in a first direction, a second member having at least one reflecting surface for receiving light from the pilot lamp and directing it to the viewfinder in a second direction, whereby the operator can readily observe the light regardless of whether the camera is horizontally or vertically positioned.

7 Claims, 4 Drawing Figures

PILOT LAMP UNIT FOR USE WITH AN ELECTRONIC FLASHLIGHT

In taking photographs with a camera equipped with a conventional electronic flashlight, a photographer must confirm that the pilot lamp built in the electronic flashlight is on every time before he releases the shutter in order to know that the electronic flashlight is ready for flashing. For doing this, he has to move his eye from the viewfinder of the camera. This often causes him to lose the much-waited shutter chance. A known method of removing this disadvantage is to build a pilot lamp for electronic flashlight inside the viewfinder of the camera. However, this is only applicable to new equipment.

According to this invention, a pilot lamp is built into an adapter which is designed to be attached to the eyepiece of the camera viewfinder, and which allows the photographer to see the light of the pilot lamp without taking his eye from the viewfinder eyepiece.

When the pilot lamp is placed very close to the eyepiece of a camera, our eye covers a wide view in the right and left directions (horizontal direction), but it has no coverage in the upper and lower directions (vertical direction) because it is interrupted by the upper and lower eyelids. Therefore, there is a problem when the camera is turned by 90° from the horizontal position.

In accordance with this invention, however, the light from a neon pilot lamp is reflected by a reflecting mirror so that the light can be seen when the camera is in a vertical position.

Since the light path from the pilot lamp can use a portion of a transparent body formed into one unit as the reflecting surface, the adapter can be produced easily.

The present invention will be described more in detail referring to an illustrative embodiment shown in the attached drawings, in which.

Figure 1:
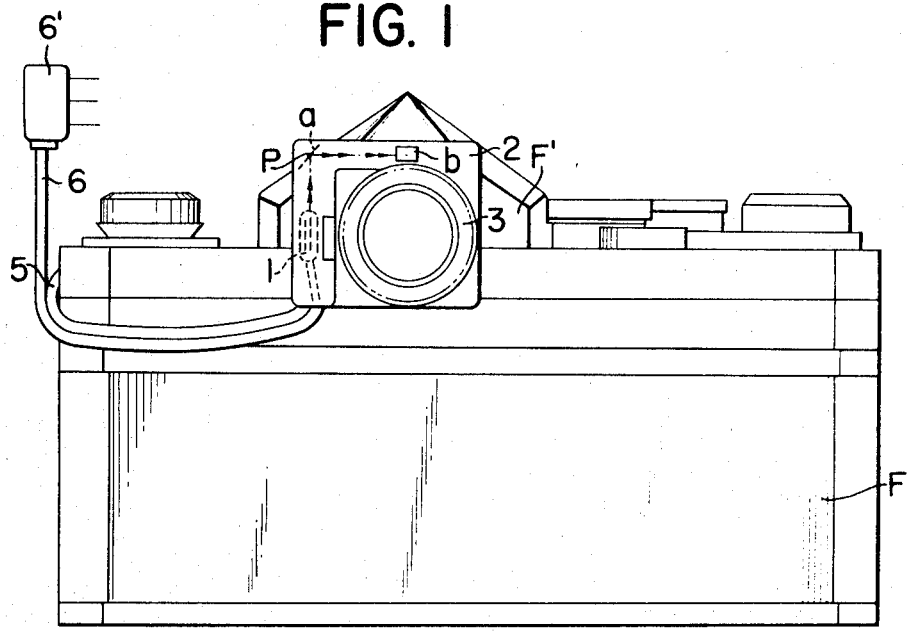
FIG. 1 is a side elevational view of a camera incorporating an adapter and pilot lamp unit according to this invention.
Figure 2:
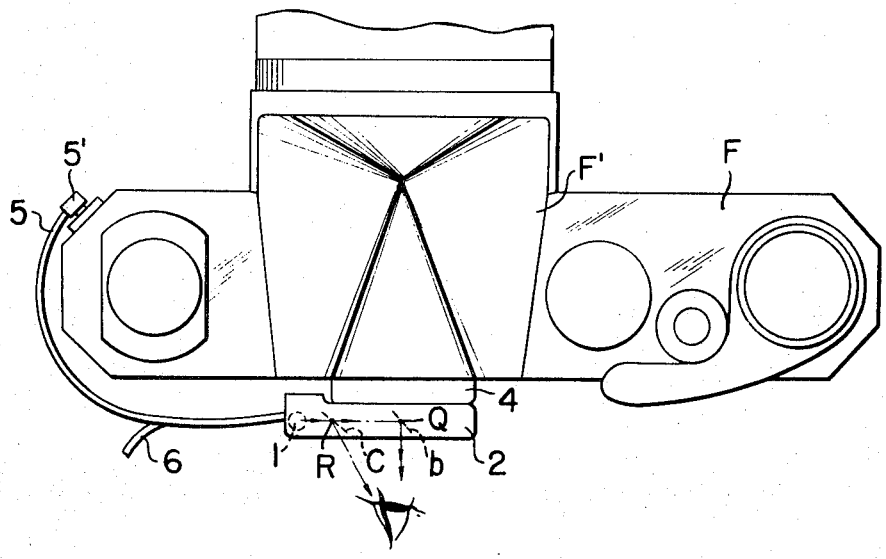
FIG. 2 shows a plan view of the embodiment shown in FIG. 1.

This design will be described more in detail by referring to the attached drawings. FIG. 1 shows an adapter according to this invention viewfinder attached to an eyepiece of the camera wherein 1 is a pilot lamp; 2 is an outer shell of the adapter; 3 is a retaining ring used to attach the outer shell 2 containing the pilot lamp etc., to the eyepiece 4 (FIG. 2) of the camera by means of screws, bayonet, etc., 5 is a synchrocord connecting to a synchrosocket of the camera, 6 is a power supply cord used to connect the adapter to the electronic flash (speed light or strobo flash); 6' is a plug to connect the cord 6 to the electronic flash; $a$ and $b$ are the reflecting surfaces which convert the light path of aforementioned pilot lamp; P and Q are the points used to explain the state of the light path at each reflecting surface $a$ or $b$; F is the camera body, and F' is the viewfinder section of the camera.

Figure 3:
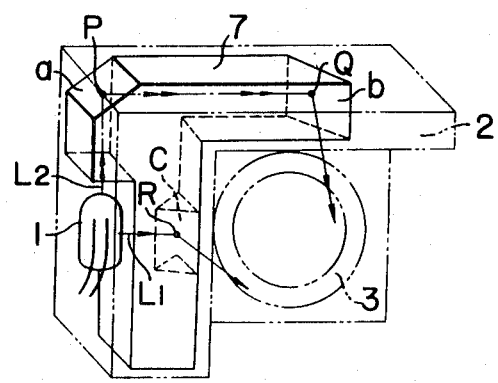
FIG. 3 shows a perspective view of the light path of the adapter.

FIG. 3 is the perspective view showing the light path of the pilot lamp contained in the adapter, wherein 1 is the pilot lamp and 7 is a transparent or semitransparent substance taking a special form and having reflecting surfaces $a$, $b$, $c$, etc.

Figure 4:
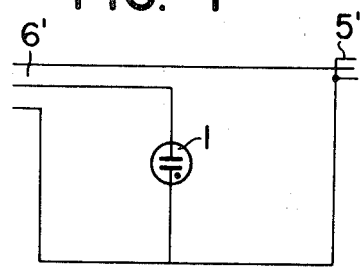
FIG. 4 shows a wiring diagram of the pilot lamp unit of this invention.

FIG. 4 is the wiring diagram of the adapter of this invention. When the adapter is connected to the eyepiece 4 of the camera viewfinder by means of the retaining ring 3 and the adapter is connected to an electronic flash having a pilot lamp terminal by means of the synchrocord, the pilot lamp 1 goes on. The light $L_1$ from the pilot lamp 1 is reflected by the reflecting surface $c$ at point R and reaches the eye of a photographer who is holding the camera in its horizontal position and observing an object through the camera finder so that the photographer can ascertain that the pilot lamp is on. The reflecting surface $c$ is so arranged as to bend the light from the pilot lamp by 90°, or more than 90°, so that the photographer can observe the light from the pilot lamp outside of the viewfinder.

As aforementioned the eye covers a wide view in the horizontal direction but covers only a very narrow view in the vertical direction when seeing such a closeup object such as in case of the present adapter. Therefore, when the camera is held in vertical position, the light reflected by the surface $c$ comes in above or below the eye so that it can not be seen by the photographer at all. In this case, however, the light of the pilot lamp which is bent by the surface $a$ by 90° and reflected by the surface $b$ can be seen by the photographer. This will be described more in detail hereinafter.

Another arbitrary ray of light $L_2$ directed upwardly is reflected and bent by the reflecting surface $a$ at point P and then by reflecting surface $b$ at point Q before it reaches the eye. Therefore, the reflected light from the surface $c$ is used for horizontal position photographing, and the reflected light from the surface $b$ is used for vertical position photographing. These reflecting surfaces can be produced very easily by unit molding using transparent or semitransparent substances such as plastics, for example.

As has been described, the adapter according to this invention is very convenient for the photographer using an electronic flashlight with the camera, because the adapter is so designed that, when only attached to the eyepiece of the viewfinder of a conventional camera, it enables the photographer to ascertain by means of the pilot lamp when the electronic flashlight is ready for shooting while he is simultaneously viewing the object through the viewfinder of the camera and, moreover, the camera can be horizontally or vertically disposed.

We claim:

1. A pilot lamp unit attachable to a camera for use with an electronic flash gun comprising:
   a retaining ring provided coaxially to the eyepiece of the camera viewfinder,
   a lamp holder having an attaching portion detachably supported by said retaining ring and a lamp housing provided about said attaching portion,
   a pilot lamp provided in said lamp housing and connected to the flash gun by the electrical cable extending therefrom,
   reflecting means provided in said lamp housing and including at least two reflecting surfaces for directing the light to the eye of an observer from two different directions.

2. A pilot lamp unit according to claim 1, wherein said reflecting means is a light conductive plate of transparent substance formed in T-shape having three transparent surfaces and three reflecting surfaces, a pair of surfaces of said transparent surfaces facing to said pilot lamp and a remaining surface to the eye, one surface of said reflecting surfaces directing the light passing through one surface of said pair of transparent surfaces to the eye, and remaining reflecting surfaces directing the light passing through the other surface of said pair of transparent surfaces to the eye.

3. A pilot lamp unit, for use with an electronic flash gun, attachable to a camera having a viewfinder, the combination comprising a pilot lamp, a first member having means for deflecting the path of light, means mounting said first member for receiving light from said pilot lamp and directing it to said viewfinder in a first direction, a second member having means for deflecting the path of light, means mounting said second member for receiving light from said pilot lamp and directing it to said viewfinder in a second diverse direction.

4. A pilot lamp unit according to claim 3 wherein said second direction is at an angle of substantially 90° with respect to said first direction.

5. A pilot lamp unit according to claim 3 wherein said first member having means for deflecting the path of light is a member having a reflecting surface.

6. A pilot lamp unit according to claim 3 wherein said second member is at least a semitransparent member having a first reflecting surface for receiving from said pilot lamp, a second spaced reflecting surface for receiving light from said first reflecting surface and directing it to said viewfinder at an angle of substantially 90° with respect to said first direction.

7. A pilot lamp unit according to claim 3 wherein said first and second members are fabricated from a unitary at least semitransparent member.

* * * * *